United States Patent
Putz et al.

(10) Patent No.: US 9,916,066 B2
(45) Date of Patent: *Mar. 13, 2018

(54) OBJECT TRANSFER METHOD USING GESTURE-BASED COMPUTING DEVICE

(71) Applicant: LogMeIn, Inc., Boston, MA (US)

(72) Inventors: A'kos Putz, Budapest (HU); Gyuri Juha'sz, Budapest (HU); Marton B. Anka, Windham, NH (US)

(73) Assignee: LogMeIn, Inc., Boston, MA (US)

( * ) Notice: Subject to any disclaimer, the term of this patent is extended or adjusted under 35 U.S.C. 154(b) by 723 days.

This patent is subject to a terminal disclaimer.

(21) Appl. No.: 14/336,070

(22) Filed: Jul. 21, 2014

(65) Prior Publication Data

US 2015/0046835 A1 Feb. 12, 2015

Related U.S. Application Data

(63) Continuation of application No. 13/160,339, filed on Jun. 14, 2011, now Pat. No. 8,788,947.

(51) Int. Cl.

| | |
|---|---|
| *G06F 3/00* | (2006.01) |
| *G06F 3/033* | (2013.01) |
| *G06F 3/0484* | (2013.01) |
| *G06F 3/0486* | (2013.01) |
| *G06F 3/0488* | (2013.01) |
| *G06F 3/0481* | (2013.01) |

(52) U.S. Cl.
CPC .......... *G06F 3/0484* (2013.01); *G06F 3/0481* (2013.01); *G06F 3/0486* (2013.01); *G06F 3/04883* (2013.01)

(58) Field of Classification Search
CPC ... G06F 3/0484; G06F 3/04883; G06F 3/0481
USPC .................................................. 715/748, 863
See application file for complete search history.

(56) References Cited

U.S. PATENT DOCUMENTS

| | | | | |
|---|---|---|---|---|
| 5,767,851 A | * | 6/1998 | Yee ........................ | G06F 3/0486 715/748 |
| 7,106,464 B1 | * | 9/2006 | Brylov ............... | H04N 1/00236 358/1.15 |
| 2002/0049978 A1 | * | 4/2002 | Rodriguez ............ | G06F 3/0486 725/86 |
| 2002/0196271 A1 | * | 12/2002 | Windl ................... | G06F 3/0486 715/734 |

(Continued)

*Primary Examiner* — Shourjo Dasgupta
(74) *Attorney, Agent, or Firm* — David H. Judson

(57) ABSTRACT

A mobile device has a display that supports gesture-based control operations. Computers maintain connections to a remote access service. The user desires to copy and/or move resources between first and second of his connected computers. After receipt of data indicating a first gesture requesting an operation with respect to the resource, an overview of one or more target devices is displayed. The overview is a folder level view of all folders and files located on the target devices. In addition, an additional display element is shown. This element is a representation of the resource from which the operation has been requested. The element is displayed as an overlay, and it is adapted to be selectively positioned in the overview using a gesture. Upon receipt of data indicating a second gesture positioning the representation over an available location within a computer connected to the service, the operation is completed.

10 Claims, 10 Drawing Sheets

(56) References Cited

U.S. PATENT DOCUMENTS

| | | | |
|---|---|---|---|
| 2003/0066032 A1* | 4/2003 | Ramachandran ... | G06F 3/04847 715/234 |
| 2005/0114711 A1* | 5/2005 | Hesselink .......... | H04L 63/0209 726/4 |
| 2007/0146325 A1* | 6/2007 | Poston ................ | G06F 3/0317 345/163 |
| 2008/0306999 A1* | 12/2008 | Finger ................ | G06F 17/3002 |
| 2009/0030971 A1* | 1/2009 | Trivedi ............... | G06F 3/0486 709/203 |
| 2009/0106666 A1* | 4/2009 | Nomura .............. | G06F 17/30126 715/748 |
| 2010/0138743 A1* | 6/2010 | Chou .................. | G06F 3/0486 715/702 |
| 2011/0060994 A1* | 3/2011 | Maxwell ............. | G06F 3/147 715/730 |
| 2011/0072344 A1* | 3/2011 | Harris ................. | G06F 3/04817 715/702 |
| 2012/0072853 A1* | 3/2012 | Krigstrom ........... | G06F 3/0486 715/748 |

\* cited by examiner

| | | |
|---|---|---|
| iPad 📶 | 12:18 PM | Not Charging 🔌 |

⚙️ [KFARRELL-KIDS3 > DOCUMENTS]      [3] [⏭]

| | | |
|---|---|---|
| 📄 2nd newspapaer.doc | Mar 15, 2008 8:28:59 PM | 22.0 KB |
| 📄 ].doc | Nov 23, 2009 6:55:21 PM | 23.5 KB |
| 📄 a global team.doc | Jun 13, 2008 8:47:56 PM | 23.5 KB |
| 📄 A Whole New World.doc | Oct 24, 2009 4:14:49 PM | 20.5 KB |
| 📄 ABC'S STUFF.doc | Mar 14, 2010 5:44:30 PM | 24.0 KB |
| 📄 abc123.doc | Nov 19, 2007 7:13:20 PM | 25.5 KB |
| 📄 abercombie.doc | Jan 16, 2008 7:42:08 PM | 19.5 KB |
| 📄 Abercrombie (g2h g2g 4c).doc | Dec 28, 2008 5:07:29 PM | 25.5 KB |
| 📄 ADAM LAMBERT.doc | Nov 3, 2009 4:44:01 PM | 38.5 KB |
| 📄 Agenda Nov. 12th.doc | Nov 14, 2009 2:05:36 PM | 23.5 KB — 502 |
| 📄 Agenda March 30th, 2010.doc | Mar 30, 2010 3:41:43 PM | 25.0 KB |
| 📄 AIMLogger – Shortcut.lnk | Nov 30, 2009 6:28:02 PM | 445 bytes |

1 of 402 items (23.5 KB of 509.0 MB) selected     179.1 GB available
      506

[▶ Open] [📋 Copy] [📱 Move] [✏️ Update] [aI Rename] [🗑 Delete]

OBJECT TRANSFER METHOD USING GESTURE-BASED COMPUTING DEVICE

BACKGROUND

Technical Field

This disclosure relates generally to file management technologies that enable users of Internet-accessible devices to copy and move objects (e.g., folders and files) over a network.

Background of the Related Art

Remote access technologies, products and systems enable a user of a remote computer to access and control a host computer over a network. Internet-accessible architectures that provide their users with remote access capabilities (e.g., remote control, file transfer, display screen sharing, chat, computer management and the like) also are well-known in the prior art. Typically, these architectures are implemented as a Web-based "service," such as LogMeIn, GoToMyPC, WebEx, Adobe Connect, and others. An individual (or subscriber) who uses the service has a host computer that he or she desires to access from a remote location. Using the LogMeIn service, for example, the individual can access his or her host computer using a client computer that runs web browser software. Mobile devices, such as a smartphone or tablet (e.g., Apple iPhone® and iPad® tablet), have become ubiquitous in today's society. Faster processors, more memory, higher quality gesture-based multi-touch screens, availability of mobile broadband data, and integration of multi-media and GPS chips along with open interface mobile operating systems have opened the door for creation of a large variety of mobile applications. One such mobile application is LogMeIn Ignition, a remote access application by which the user of the device can remotely access, control and manage a host computer that maintains a connection to a Web-based remote access service.

BRIEF SUMMARY

A file transfer method is operative in a mobile computing device having a display interface that utilizes gesture-based control operations. The mobile computing device includes a remote access client, and the user is a subscriber to a Web-based remote access service. One or more other computers associated with the user each maintain connections to the Web-based remote access service. The user desires to copy and/or move resources (e.g., a file, a set of files within a directory, contents of a directory, multiple directories, contents of a drive, one or more identified objects, or the like) to the mobile computing device, or between first and second of his or her connected computers.

According to the file transfer method, a first view that includes a representation of a file system is displayed on the mobile computing device display interface. This file system is associated with one of the user's computers having a connection to the Web-based remote access service. The mobile computing device user then selects a resource for transfer. After receipt of data indicating a first gesture (requesting a copy or move operation with respect to the resource in the file system), a second view is displayed. The second view replaces the first view (which is minimized), and it (the second view) displays an overview of one or more target devices. Preferably, the second view is a folder level view of folders and files located on the target devices, representing one or more other computers also having a connection (or capable of having a connection) to the Web-based remote access service. The mobile computing device's local file system preferably is also shown. In addition to displaying the folder-level view, according to the method an additional display element is shown. This display element is a representation of the resource from which the copy or move operation has been requested. The display element is displayed as an overlay (or floating "clipboard") in the second view, and it is adapted to be selectively positioned (by the user) in the second view using a gesture. The user then selects a target destination for the resource, typically another computer connected to the Web-based remote access service. This action opens up a third view, which is a representation of the target device. Thereafter, and upon receipt of data indicating a second gesture (e.g., that the representation is positioned over an available transfer location within the target device, and that the location has been selected), the copy or move operation is completed.

According to the method, as the display element is selectively positioned in the third view, its state may be changed to provide additional visual cues to the user. Thus, for example, when the display element is juxtaposed with an available transfer location, it may be modified to display an indication (e.g., "Drop Here") that the available transfer location is permitted to receive the resource. Conversely, when the display element is juxtaposed with a transfer location that is not available, it may be modified to display an indication that the copy or move is not permitted. Alternatively, the display element is prevented from being overlaid on that portion of the target device that is not accessible for the copy or move operation.

Using this file transfer technique, the mobile computing device may be used to control the copying or moving of files from one to another of the end user's connected devices. In addition, resources may be copied or moved to the mobile computing device itself for local viewing as needed.

The foregoing has outlined some of the more pertinent features of the subject matter. These features should be construed to be merely illustrative.

BRIEF DESCRIPTION OF THE DRAWINGS

For a more complete understanding of the present invention and the advantages thereof, reference is now made to the following descriptions taken in conjunction with the accompanying drawings, in which:

FIG. 5 is the first view after a particular resource has been selected by the user;

FIG. 9 is the display interface of the mobile device after the user has navigated to a location within a directory of the file system of the target device;

FIG. 10 is the display interface of the mobile device showing a confirmation dialog that is presented to the user after the copy or move operation has been initiated.

DETAILED DESCRIPTION OF AN ILLUSTRATIVE EMBODIMENT

As described above, according to this disclosure, a mobile device user desires to copy or move a "resource" from one to another of the user's host computer(s) (which may be the mobile device itself) that maintain (or can be controlled to initiate) connection(s) to a Web-based remote access architecture. To this end, the mobile device includes a remote access client application, such as LogMeIn Ignition, which is augmented to provide the file transfer functionality described herein. The client application may be downloaded and installed via a mobile application delivery service, such as the Apple® App™ Store.

Figure 1:
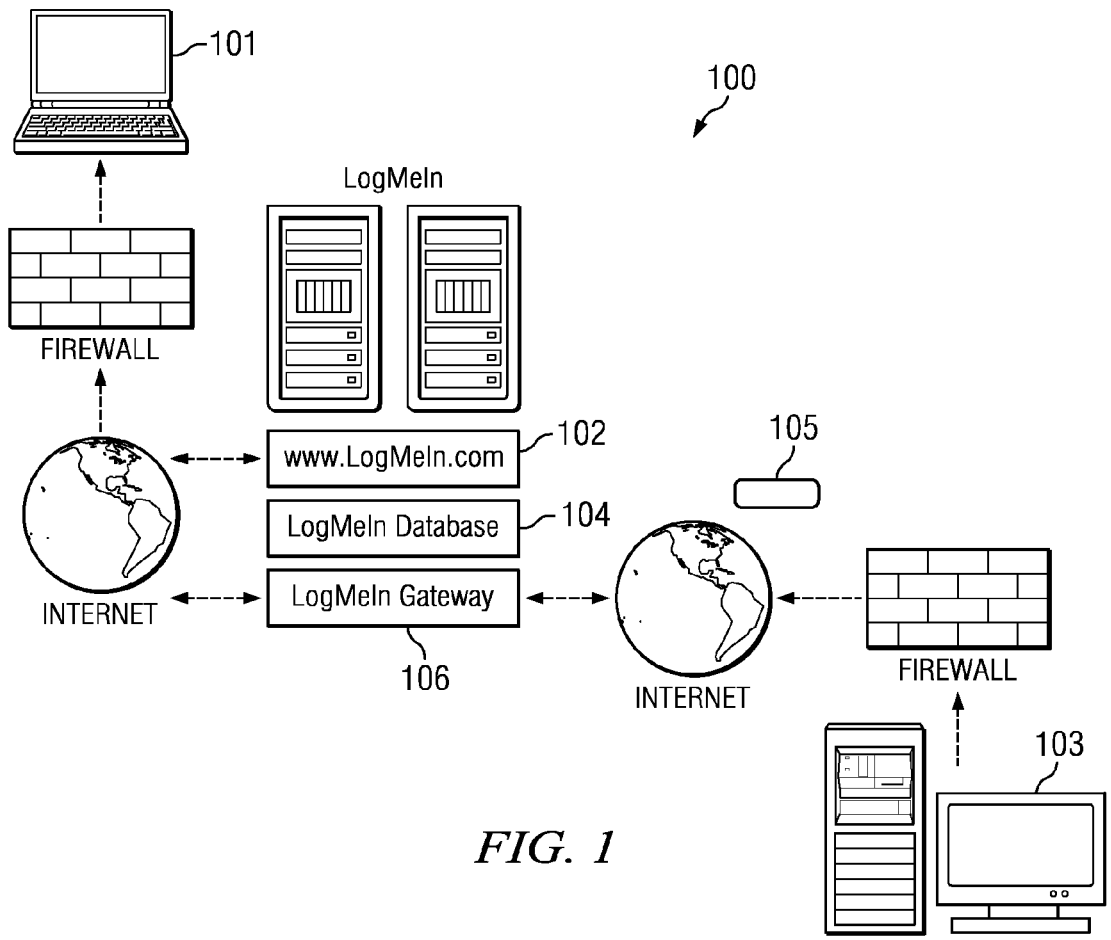
FIG. 1 depicts an extensible Web-based remote access architecture in which exemplary aspects of the file transfer method may be implemented.

FIG. 1 illustrates a high level view of a remote access architecture 100 in which the disclosed technique may be practiced. This architecture is merely representative, and it should not be taken as limiting. Preferably, the architecture comprises "n-tiers" that include a web server tier 102, a database tier 104, and a gateway tier 106. The web server tier 102 comprises a plurality of machines that each executes web server software. The web server tier provides an Internet-accessible web site. Preferably, the web site associated with a site domain (however designated) is available from multiple locations that collectively comprise the web server tier 102. The database tier 104 comprises a plurality of machines that each executes database server software. The database tier provides a network-accessible data storage service for generating and storing data associated with end user sessions to the remote access service. The gateway tier 106 comprises a plurality of machines that each executes application server software. The gateway tier provides a network-accessible connection service for establishing and maintaining connections between and among the participating end user computers. Although not shown, preferably end user computers connect to the gateway servers over secure connections, e.g., over SSL, TLS, or the like. A representative machine on which the web server, database server or gateway server executes comprises commodity hardware (e.g., one or more processors) running an operating system kernel, applications, and utilities.

Figure 2:
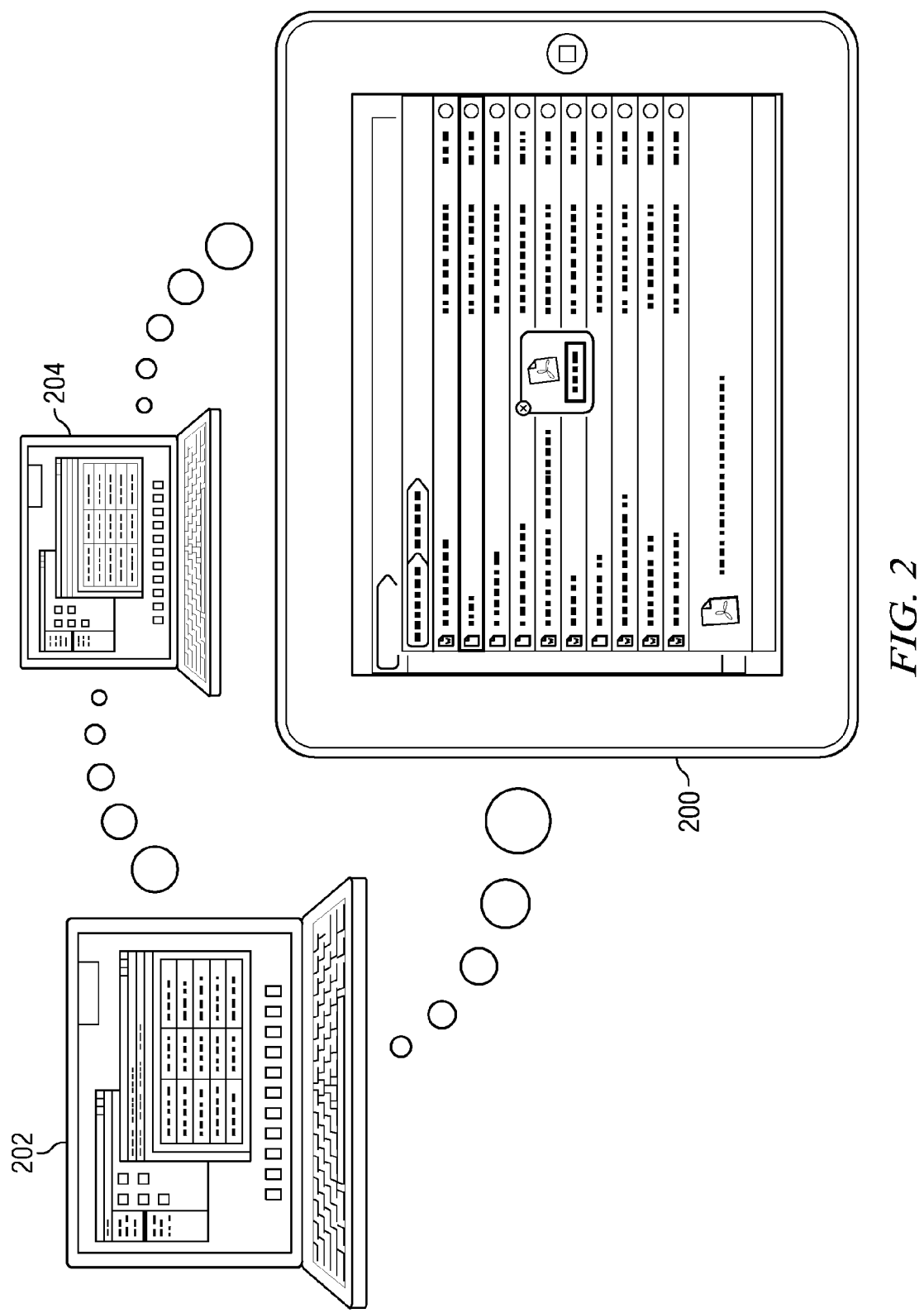
FIG. 2 is an illustrative use case in which a mobile device user desires to copy or move a resource from one to another of his or her host computers that maintain connections to the Web-based remote access architecture in FIG. 1.

FIG. 2 is an illustrative use case in which a mobile device user desires to copy or move a resource from one to another of his or her host computers that maintain connections to the Web-based remote access architecture in FIG. 1. As noted above, the mobile device includes a remote access client application to facilitate this operation. In this example, the mobile device is an Apple iPad® or iPad2 200, and the end user desires to copy or move a resource from computer 202, to computer 204. Typically, the mobile device 200 is used to manage the file transfer, but the resource copy or move operation is peer-to-peer, namely, from the source computer (e.g. 202) to the target computer (e.g., 204). The resource copy or move may go through the mobile device. In addition, the target location of the copy or move operation may be the mobile device itself.

Figure 3:
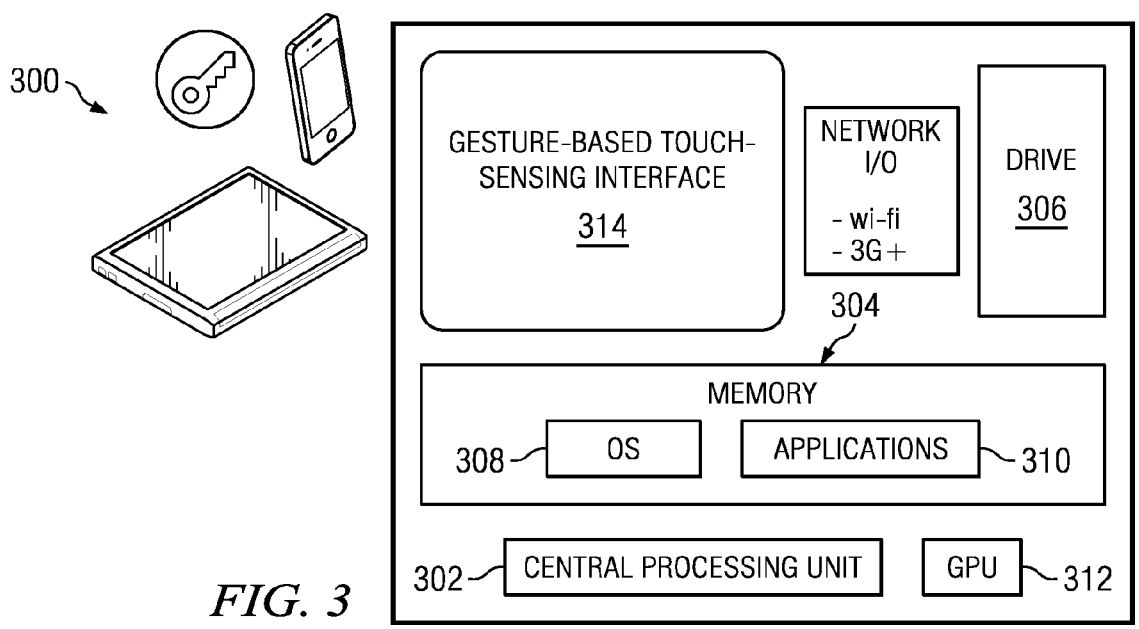
FIG. 3 is an exemplary block diagram of a mobile device in which the file transfer method of the disclosure is implemented.

Preferably, the mobile device is a smartphone or tablet, such as the iPhone® or iPad®, but this is not a limitation. As seen in FIG. 3, the device 300 comprises a CPU (central processing unit) 302, such as any Intel- or AMD-based chip, computer memory 304, such as RAM, and a drive 306. The device software includes an operating system (e.g., Apple iOS) 308, and generic support applications and utilities 310. The device may also include a graphics processing unit (GPU) 312. In particular, the mobile device also includes a touch-sensing device or interface 314 configured to receive input from a user's touch and to send this information to processor 312. The touch-sensing device typically is a touch screen. The touch-sensing device or interface 314 recognizes touches, as well as the position, motion and magnitude of touches on a touch sensitive surface (gestures). In operation, the touch-sensing device detects and reports the touches to the processor 312, which then interpret the touches in accordance with its programming. Typically, the touch screen is positioned over or in front of a display screen, integrated with a display device, or it can be a separate component, such as a touch pad. The touch-sensing device is based on sensing technologies including, without limitation, capacitive sensing, resistive sensing, surface acoustic wave sensing, pressure sensing, optical sensing, and/or the like. The touch-sensing can be based on single point sensing or multipoint sensing. Single point sensing is capable of only distinguishing a single touch, while multipoint sensing is capable of distinguishing multiple touches that occur at the same time. The touch-sensing can include actual contact of the touch-sensing device, near-touch of the touch-sensing device (e.g. detecting hovering), or remote detection of the user by the touch-sensing device.

The mobile device comprises suitable programming to facilitate gesture-based control, in a manner that is known in the art. Although the file transfer method described below takes advantage of gestures, the particular gesture-based controls are not an aspect of this disclosure. The mobile device gesture-based touch-sensing interface receives one or more gestures, such as selection (placing a finger on a display element), tapping (on a display element), dragging (placing a finger on a display element and moving the finger), and dropping (releasing a finger from a display element following dragging), and so forth.

Generalizing, the mobile device is any wireless client device, e.g., a cellphone, pager, a personal digital assistant (PDA, e.g., with GPRS NIC), a mobile computer with a smartphone client, or the like. Other mobile devices in which the technique may be practiced include any access protocol-enabled device (e.g., a Blackberry® device, an Android™-based device, or the like) that is capable of sending and receiving data in a wireless manner using a wireless protocol. Typical wireless protocols are: WiFi, GSM/GPRS, CDMA or WiMax. These protocols implement the ISO/OSI Physical and Data Link layers (Layers 1 & 2) upon which a traditional networking stack is built, complete with IP, TCP, SSL/TLS and HTTP.

In a representative embodiment, the mobile device is a cellular telephone that operates over GPRS (General Packet Radio Service), which is a data technology for GSM networks. In addition to a conventional voice communication, a given mobile device can communicate with another such device via many different types of message transfer techniques, including SMS (short message service), enhanced SMS (EMS), multi-media message (MMS), email, WAP, paging, or other known or later-developed wireless data formats. Generalizing, a mobile device as used herein is a 3G- (or next generation) compliant device that includes a subscriber identity module (SIM), which is a smart card that carries subscriber-specific information, mobile equipment (e.g., radio and associated signal processing devices), a man-machine interface (MMI), and one or more interfaces to external devices (e.g., computers, PDAs, and the like). The techniques disclosed herein are not limited for use with a mobile device that uses a particular access protocol. The mobile device typically also has support for wireless local area network (WLAN) technologies, such as Wi-Fi. WLAN is based on IEEE 802.11 standards.

Gesture-Based File Management

As described above, a file transfer method according to this disclosure is operative in a mobile computing device, such as shown in FIG. 3, having a display interface that supports gesture-based control operations. The mobile computing device includes a remote access client, such as LogMeIn Ignition, that has been augmented to provide the described functionality. One or more other computers associated with or accessible to the user each maintain connections to a Web-based remote access service, such as LogMeIn®, as illustrated in FIG. 1. In a typical use case, such as described above with respect to FIG. 2, the user desires to copy and/or move a resource between first and second of his or her connected or associated computers, although this is not a limitation, as the user may also copy and/or move resources to the mobile device itself.

According to the file transfer method, and as will be described, after receipt of data indicating a first gesture requesting a copy or move operation with respect to the resource in the file system, an overview of one or more target devices is displayed. Preferably, the overview is a folder level view of all folders and files located on the target devices, which are the one or more other computers also having a connection (or capable of having a connection) to the Web-based remote access service. In addition to displaying the folder-level view, an additional display element (sometimes referred to herein as a "ghost") is shown. This display element is a representation of the resource from which the copy or move operation has been requested. The display element is displayed as an overlay (preferably in the form of a "floating" clipboard-like object), and it is adapted to be selectively positioned (by the user) in the overview using a gesture. The user then selects a target device to receive the resource. This generates a third view, typically of the target device file system. Thereafter, and upon receipt of data indicating a second gesture (that has caused the representation to be positioned over an available transfer location within the target, and the selection of the location), the copy or move operation is completed.

As the display element is positioned by the user using one or more gestures, the display "state" of the element may be changed to provide visual cues to the user, for example, that a particular target device (or location within that device) is permitted or not permitted to receive the resource. By selectively positioning the display element, the user controls the file copy or move operation in a simple, intuitive manner. Once the copy or move is initiated (e.g., by the user tapping on the display object, by the user releasing the display object following dragging, or the like), the resource is moved or copied peer-to-peer (from the source to the target location), to the mobile device itself (if it is the target), or through the mobile device (i.e., from the source, to the mobile device, and then to the target device).

FIGS. 4-11 illustrate the typical use case.

Figure 4:
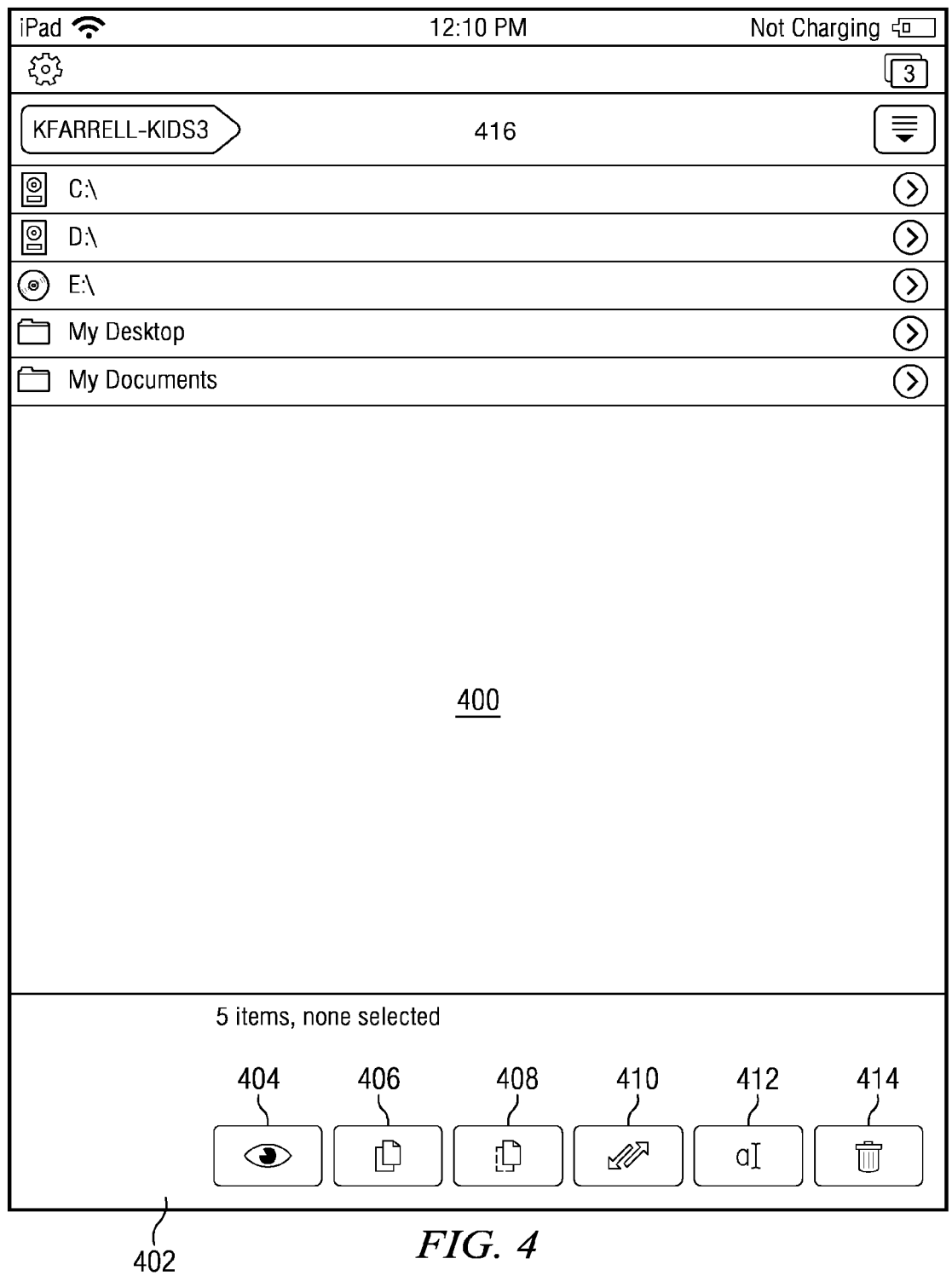
FIG. 4 is a display interface of the mobile device showing a first display view that includes a representation of a file system of a source device from which a resource to be copied or moved is selected.

In particular, FIG. 4 shows the display interface of the mobile device showing a first display view generated by the remote access application client having the file transfer capability of this disclosure. The first display view 400 includes a control panel 402 comprising several controls, open 404, copy 406, move 408, update 410, rename 412 and delete 414. The first display view 400 also includes a representation 416 of a file system of a source device from which a resource to be copied or moved is to be selected. The source device is a computer that is connected to the Web-based remote access service (or that is capable of being controlled to establish such a connection). Typically, the source computer is a machine that is holding (or that is capable of initiating) a connection to a designated gateway server in the gateway tier shown in FIG. 1. As shown in FIG. 4, the file system of the source device has several items, and the user can drill-down into the file system in a conventional manner, e.g., by selecting one of the arrows on the right hand side of the row and navigating to the desired directory or file.

As noted above, the file transfer method enables the user to select and copy/move a resource from the source computer. As used herein, a "resource" should be broadly construed to refer to one of: a file, a set of files within a directory, contents of a directory, multiple directories, contents of a drive, and one or more identified objects. FIG. 5 is the first view after a particular resource (a document) has been selected by the user. As shown in FIG. 5, after the resource 502 is selected (using a touch-based gesture), the resource is highlighted. Although not shown, the user may select one or more additional resources in the directory, in which case all of the selected resources are highlighted. The first view also provides additional text information identifying the number of items selected, as well as the size of the proposed copy or move.

The user then selects one of the controls, such as copy 506. This selection is performed by the user tapping the copy button 506.

Figure 6:
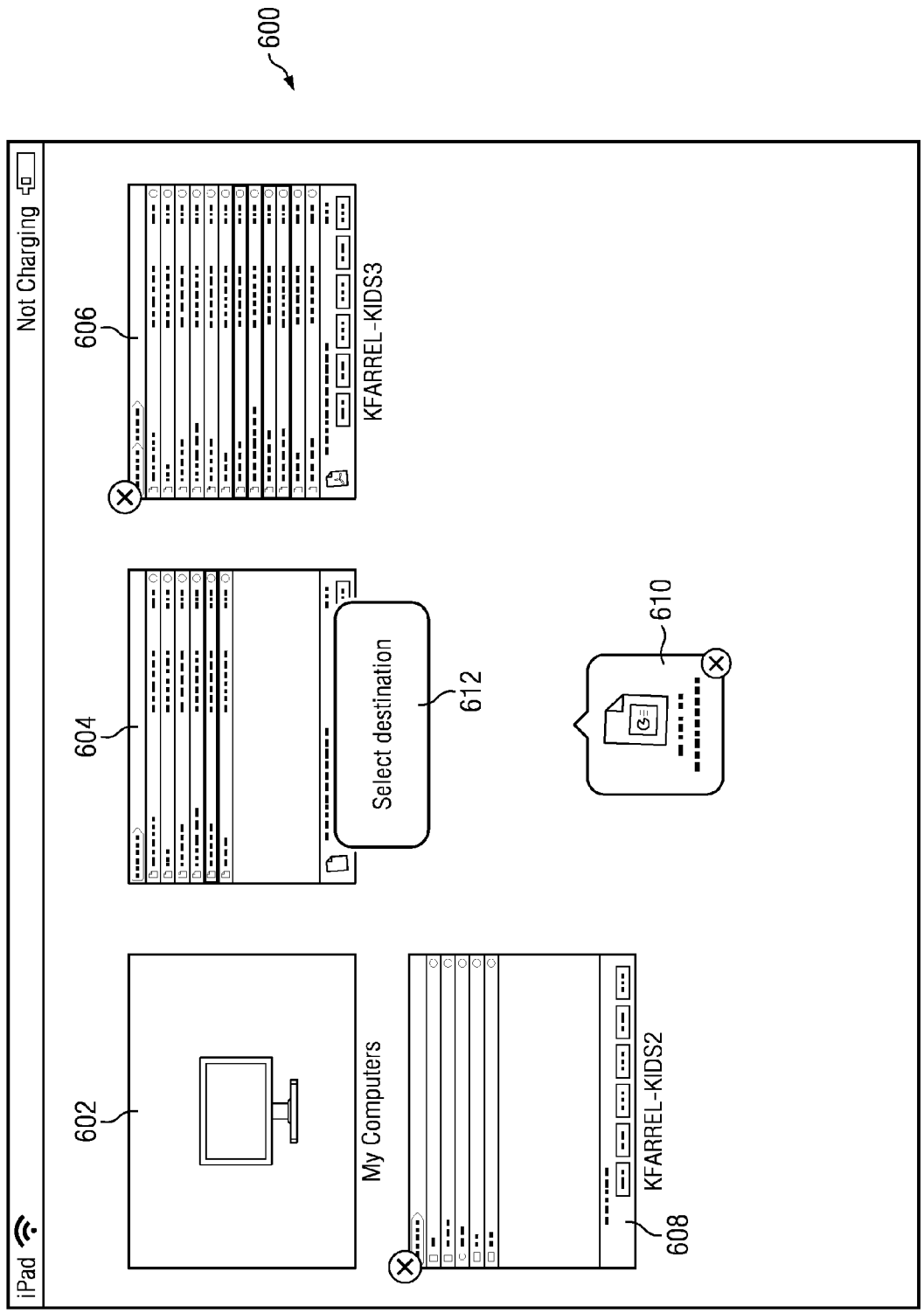
FIG. 6 is the display interface of the mobile device showing a second display view that illustrates an overview of each of the file systems of one or more target devices then connected (or connectable) to the remote access service and to which the resource may be copied or moved, together with a display element representing the resource.

FIG. 6 illustrates the resulting display interface. According to the method, the first display view (shown in FIG. 5) is minimized and replaced with a second display view 600. Preferably, the second display view 600 shows an overview of each of the file systems of one or more target devices then connected (or connectable) to the remote access service and to which the resource may be copied or moved. Thus, as shown in FIG. 6, the second display view illustrates a "My Computers" view 602, together with file system representations of several computers, namely computers 604, 606 and 608. The "My Computers" view 602 represents the one or more computers that are connected to the remote access service. The representation 604 is the local file system of the mobile device itself. The representation 606 is the file system of the source computer and, preferably, the highlighted resources remain visible, as can be seen. Representation 608 is the file system for another computer that is currently connected to the Web-based remote access service. If there are no such computers connected, the user may select one from the My Computers palette, which selection causes that computer to open a connection to the Web-based remote access service. After that connection is established, the available file system of the newly-connected computer is shown in the overview.

As also illustrated in FIG. 6, the overview includes another display element 610. This display element is a representation of the resource that has been selected for copy or move. As will be seen, this object is capable of being selectively positioned in juxtaposition with respect to a file system representation to identify a target of the file copy or move operation. The object is a "floating clipboard" that can be moved across the display using gestures, and for that reason it is sometimes referred to as a "ghost." It is a visual representation of the current selection, namely, the resource that is the subject of the current copy or move operation. Preferably, the display element 610 includes text identifying the number of resources selected for the copy or move, as well as an identification of the source computer.

Preferably, and as also seen, the overview (in FIG. 6) also displays a visual cue 612 (e.g., "Select destination") to facilitate the selection by the user of the target location. The selection is made by the user selecting one of the computers, preferably by tapping on the desired computer directly.

Figure 7:
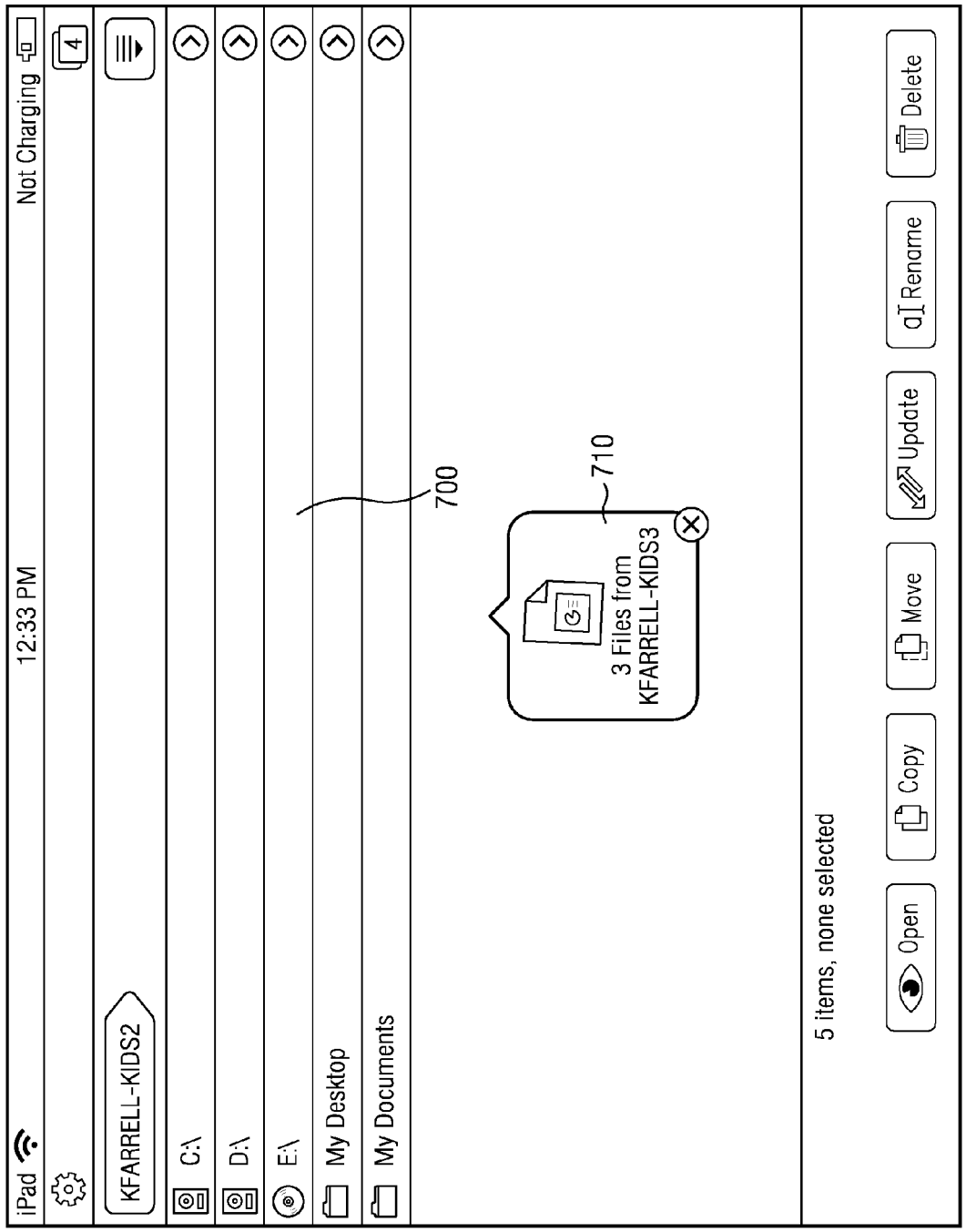
FIG. 7 is the display interface of the mobile device after the user has selected one of the target devices showing a third view, which is a representation of the file system of the target device to which the resource may be copied or moved.

To this end, FIG. 7 illustrates the display interface of the mobile device after the user has selected one of the target devices. This operation provides a third view, which replaces the second view (which, in turn, may be minimized). In this example, the user has selected (again, using a gesture), the computer 608 (from FIG. 6). As a result, a representation 700 of the file system of that device is now displayed (as the third view), together with the display element 710. In other words, the display element 710 persists (across the second and third views) as the user selects the destination computer and the target file system is displayed. With the third view displayed (as shown in FIG. 7), the end user then selects a desired target location (which may be drive, a directory within a drive, a file within a directory, and so forth). If desired or necessary (to locate the target location), the user may navigate to the desired drive, directory, or other location, etc., within the target machine, once again using the conventional navigation elements.

If the user desires to select a different target device, he or she can navigate back to the overview (FIG. 6), preferably by clicking on a button (such as the button in the top left corner in the third view). In this example, the number "4" is shown, and this represents how many computers are open in the overview.

According to the display method, preferably the available drop locations are automatically highlighted, for example, by changing the display state of the display element to include an appropriate visual cue, such as "Drop Here." Alternatively, the visual cue may be a color change. A further alternative is an aural cue. More generally, any context-sensitive action item may be used. Any of these visual and/or aural cues may be configurable. The visual cue may be an appearance or status change of a passive indicator such as text or an icon, or a dynamic control such as a button or link that allows an action to be started.

Figure 8:
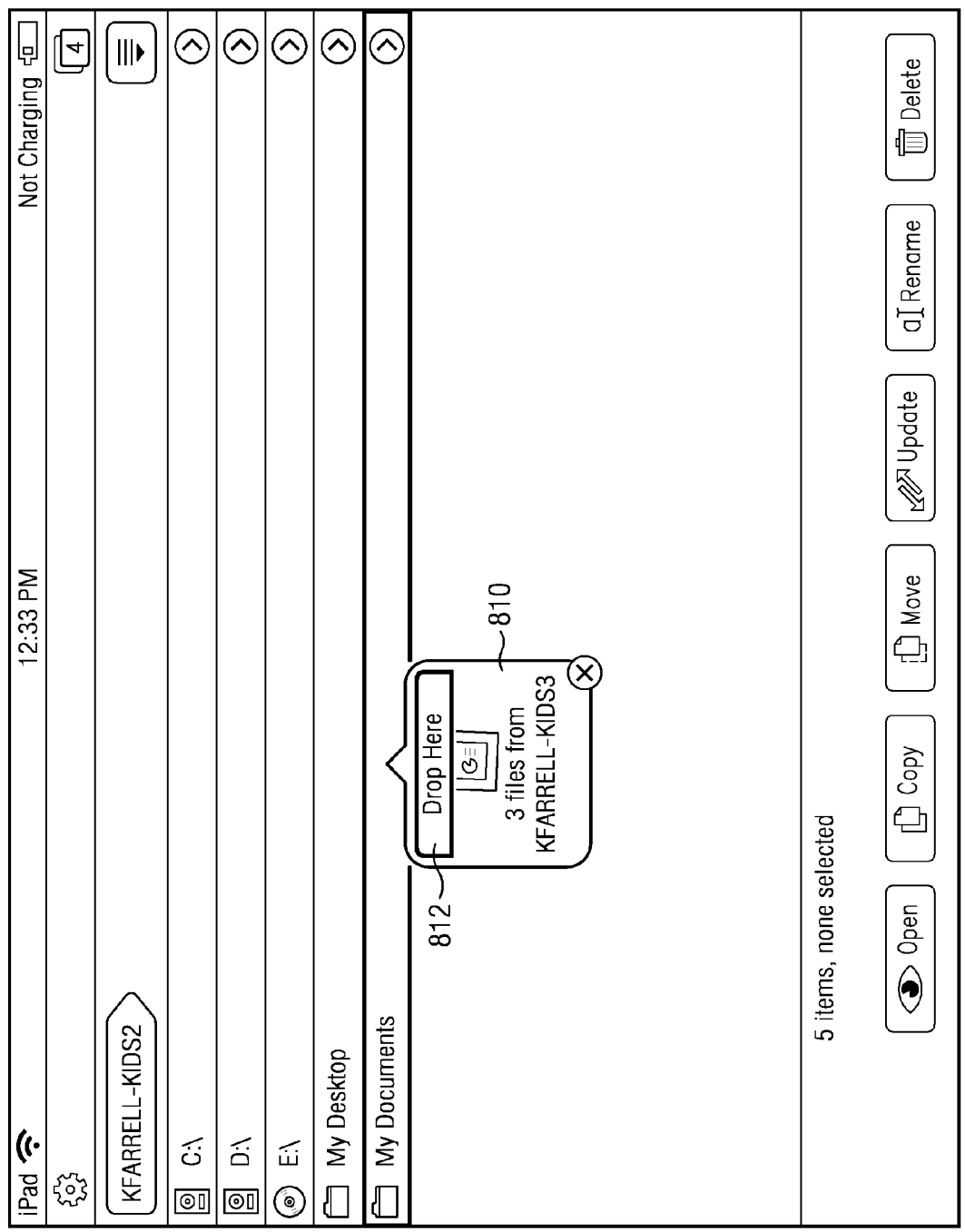
FIG. 8 is the display interface of the mobile device after the user has moved the display element in juxtaposition with an available transfer location in the file system of the target device.

FIG. 8 is the display interface of the mobile device (the third view) after the user has moved the display element 810 in juxtaposition with a transfer location in the file system of the target device. As illustrated, the display element's state has been changed to include the "Drop Here" message 812. If the display element then is moved off the drop target, the "Drop Here" message vanishes. If the target location is not an available location (e.g., because it is a secure directory, or because it is otherwise unavailable), the display element's state may be changed to include a message (not shown) indicating that the location is not available. The message may be provided by changing the color of the display element, by displaying a distinct message, or providing a similar visual cue. In another embodiment, the unavailability of the target location may be indicated by the display routines merely inhibiting the user from positioning the display object over a particular drive, directory or other resource location.

Once the desired target location is selected, the user taps/presses the Drop Here button to complete the copy or move directive. Pressing the button also preferably closes the display element. The copy or move operation is then carried out peer-to-peer (from source to target directly), from the source to the mobile device, or through the mobile device, as has been described.

The ghost preferably displays the icons of the selected file(s) in a pile, together with additional identifying information (e.g., origin, number of files, and the like). If the ghost is active (e.g., floating), the file selection cannot be modified, as the ghost is the visual representation of the current file selection.

Although not required, preferably a momentum is added to the ghost to provide further visual cues to the user. The ghost can be cancelled at any time by pressing the exit button in its lower right corner. The ghost is automatically cancelled when its source computer is disconnected. The ghost may include a designation illustrating a hotspot on which the user's finger should be placed to effect the desired action.

Figure 9:
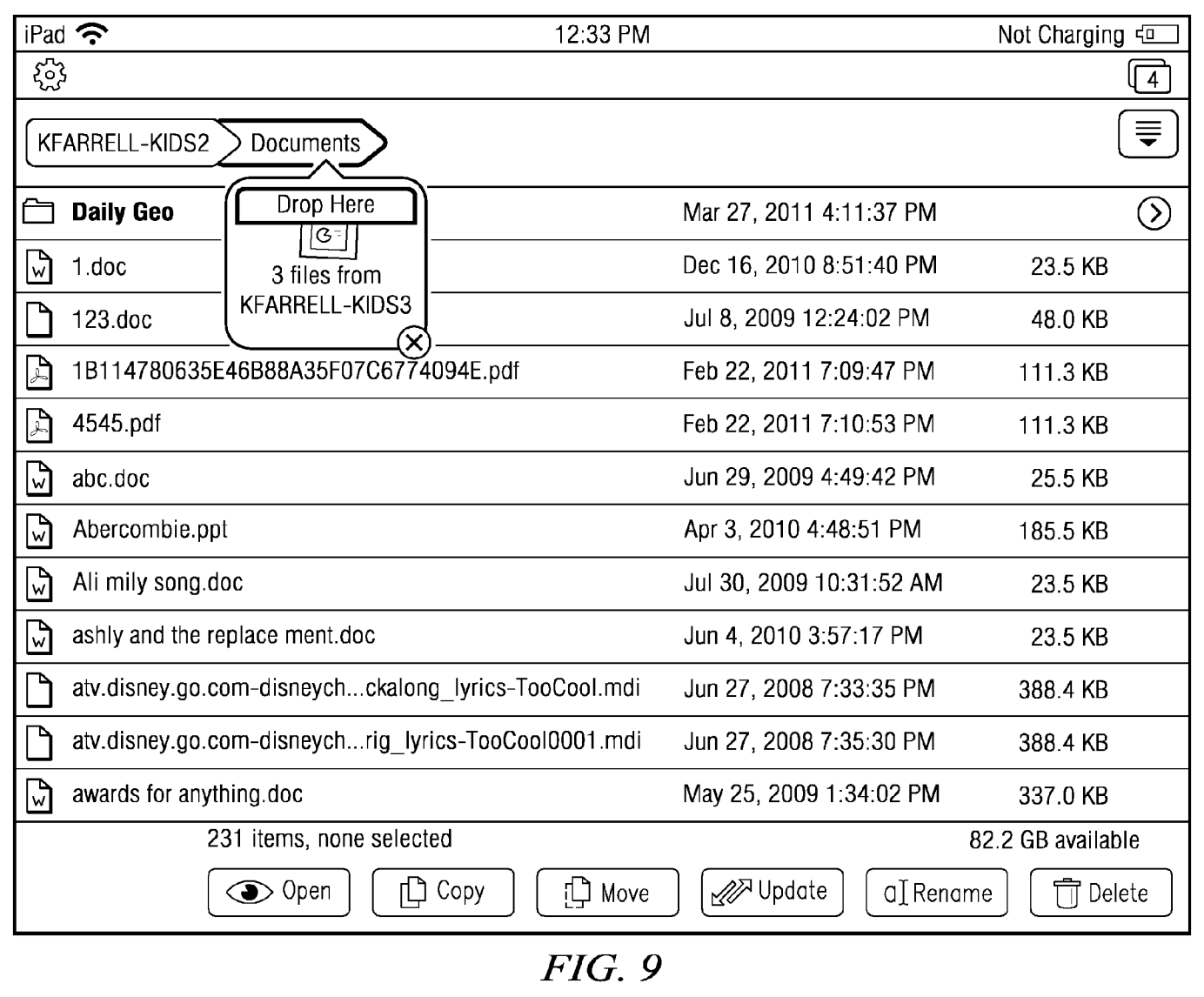

FIG. 9 illustrates an alternative way by which the user locates the desired target location. In this embodiment, the end user simply goes to the top level of the file system, chooses "Documents" and taps the Drop Here button to complete the copy or move directive. This figure also illustrates that the user interface may include a representation of where the user is "located" within the file system. This navigation (or "breadcrumb" or "trail") history facilitates the user's navigation so that he or she does not lose their "way" as they are navigating through the file system. If the trail becomes larger than a configurable size, it slides left or right to ensure that it does not interfere with the other interface element(s).

Figure 10:
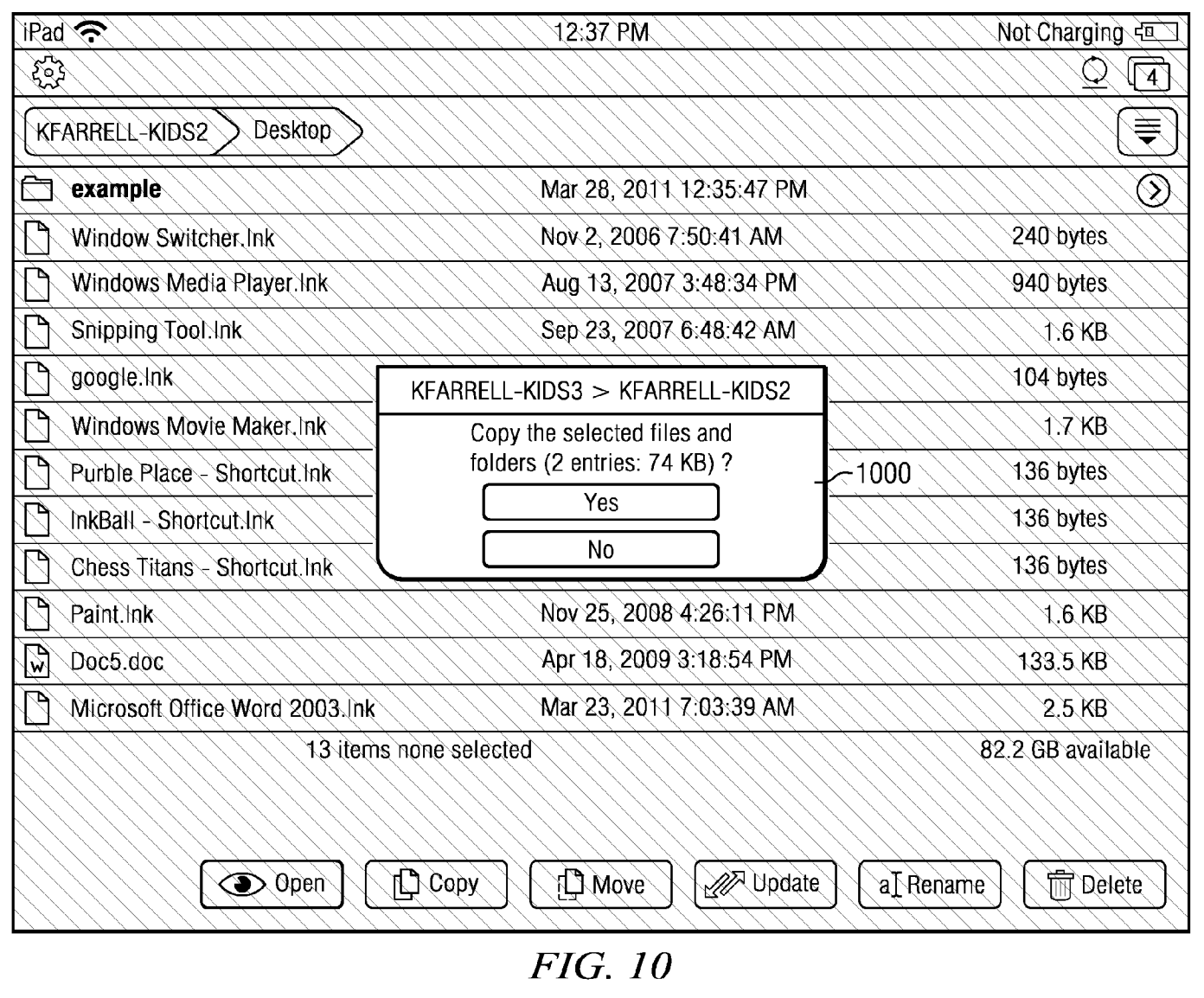

FIG. 10 is the display interface of the mobile device showing a confirmation dialog 1000 that is presented to the user after the copy or move operation has been initiated.

Figure 11:
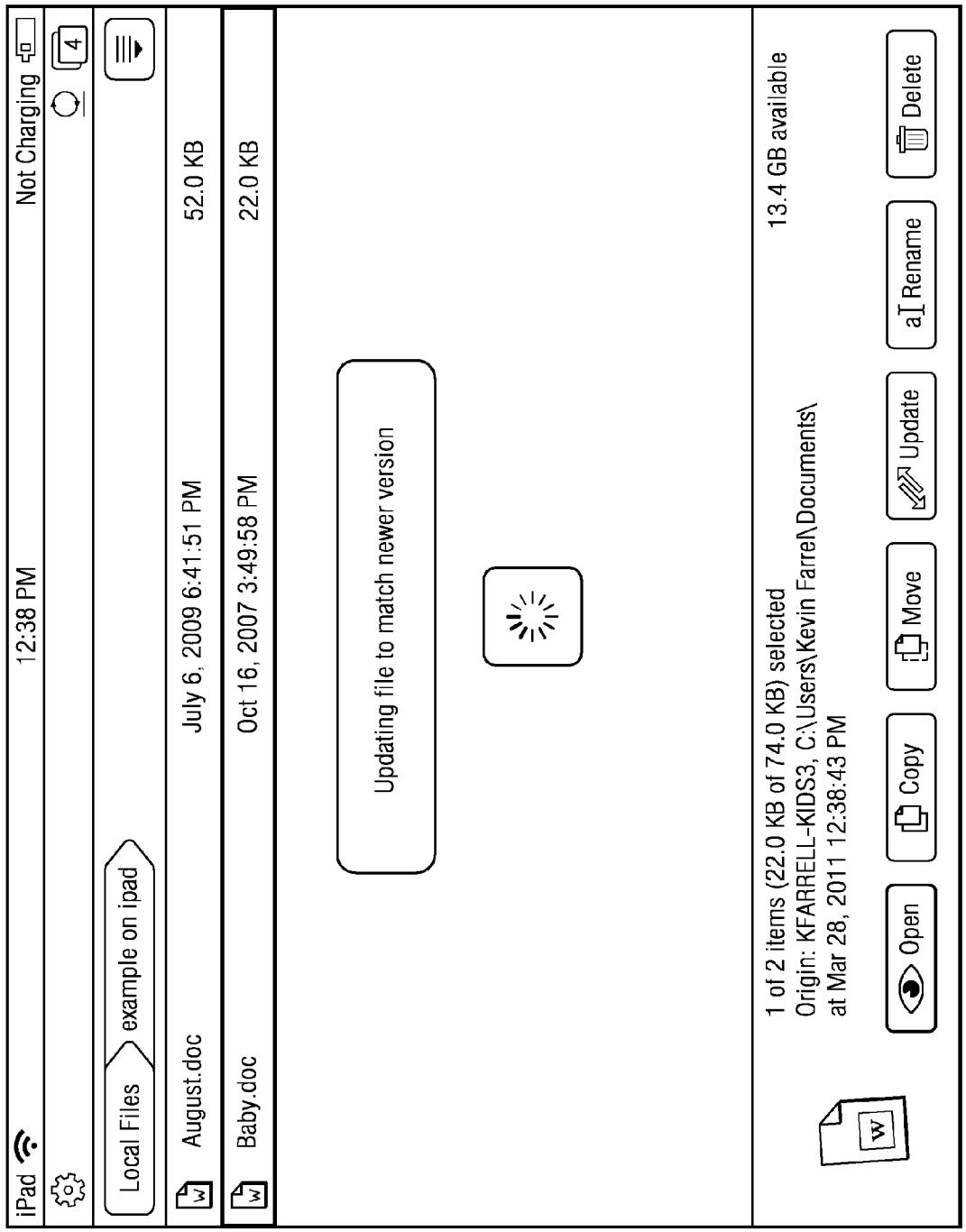
FIG. 11 is the display interface of the mobile device illustrating a local update function to maintain the resource current on the mobile device.

As noted above, the target location for the copy or move operation may be the tablet device itself. In such case, the "update" function button may be selected (by a gesture) to maintain a current copy of the resource that has been copied to the device. By selecting the local file on the device and selecting the "update," the remote access client automatically updates the file on the mobile device from its original source location on the remote computer. FIG. 11 is the display interface of the mobile device illustrating a local update function to maintain the resource current on the mobile device.

The disclosed technique provides a unique, easy-to-use file transfer method. When the copy/move action is initiated, the visual representation of the current selection (the display object) is automatically activated within the context of the overview (the available destination targets), and it can be readily manipulated using a gesture. Available drop locations are automatically highlighted, and a "Drop Here" (or the like) button is displayed on the display element as it overlays an available transfer location. Dragging the element above local files and My Computers buttons opens the local window and/or My Computers window, respectively, enabling the user to target a specific location.

Thus, in a typical use case, as has been described and illustrated, activating the display element automatically enters the overview mode; closing the display element deactivates the overview mode. Other display modes, however, may be implemented as well. Thus, for example, in another embodiment, dragging the display element above a background window brings that window into the foreground, but without rearranging the whole window stack. Dragging the display element on the edge of the display may also scroll the display to a next window in a window stack.

The particular gestures used to implement control actions may be varied. Typically, a single tap selects/deselects an item. A single tap on a folder accessory button navigates into the given folder. A double tap opens files and enters folders.

As illustrated in FIG. 4, the bottom area of the file management window includes a set of control buttons. Tapping the open button opens files for viewing or enters folders. Tapping the copy button initiates a copy action with the ghost but only if some items are selected. Tapping the move button initiates a move action with the ghost but only if some items are selected. Tapping the update button initiates an update action but only if one file is selected and the display window is local and origin information (for the file) is available. Tapping the rename button displays a modal dialog but only if one item is selected. Tapping the delete button displays a modal dialog before deleting the selection but only if some items are selected.

Although not meant to be limiting, if the display element is active (i.e., it has been selected), selecting or deselecting files is inhibited.

Although not meant to be limiting, preferably the originating folder (from the source computer) and its subfolders are not drop targets for the selected resource.

Dropping the display element preferably starts the copy or move transfers, as has been described. Transfers preferably occur over separate background connections so as not to block the navigation session.

Typically, when a file is not yet fully transferred to its destination, it cannot be selected in the destination window, although a progress bar is displayed on the file item's row in the file system.

As noted above, once a file is copied from a source location to the local storage on the mobile device, its origin information is automatically remembered, and the file can be automatically updated with the latest remote contents (from the source) by activating the update action.

Preferably, when a remote file is opened (either with the "open" action or by double-tapping), a background transfer is initiated. After the file is available locally (in an internal folder), viewing/opening the file starts automatically. After the viewer is dismissed, however, preferably a confirmation dialog is presented, and this dialog asks the user if he or she wants to keep the downloaded file locally or note.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

While the disclosed subject matter has been described in the context of a method or process, the subject disclosure also relates to apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including an optical disk, a CD-ROM, and a magnetic-optical disk, a read-only memory (ROM), a random access memory (RAM), a magnetic or optical card, or any type of media suitable for storing electronic instructions, and each coupled to a computer system bus.

While given components of the system have been described separately, one of ordinary skill will appreciate that some of the functions may be combined or shared in given instructions, program sequences, code portions, and the like.

Having described our invention, what we now claim is as follows:

1. A computer program product comprising a non-transitory machine-readable medium that stores a program, the program being executable by a machine having a display, the program comprising computer program instructions executable by a hardware processor in the machine, the computer program instructions comprising:

program code, operative upon receipt in a first display view on the display of data indicating a copy or move action with respect to a selected resource on a source device, to automatically minimize the first display view and to cause display, on the display, of a second display view, the second display view including a reduced version of the first display view together with an overview of a target device;

program code to automatically activate and display, in an initial position, and in the second display view, a visual representation of the selected resource, the initial position being one that does not overlie the target device shown in the second display view; and program code, operative upon receipt of data indicating that the visual representation is positioned on an available drop location on the target device, to attempt to complete the copy or move action.

2. The computer program product as described in claim 1 wherein the computer program instructions further including program code to modify a visual state of the visual representation to identify the available drop location.

3. The computer program product as described in claim 2 wherein the visual state is modified by incorporating a message in the visual representation.

4. The computer program product as described in claim 2 wherein the computer program instructions further include program code to adjust a perceived momentum of the visual representation during a movement of the visual representation from the initial position to the available drop location.

5. The computer program product as described in claim 1 wherein the target device represents a physical device that, at a time at which the first and second views are displayed, are currently accessible to a remote access service.

6. The computer program product as described in claim 1 wherein the selected resource is one of: a file, a set of files within a directory, contents of a directory, multiple directories, contents of a drive, and one or more identified objects.

7. The computer program product as described in claim 1 wherein the copy or move operation is associated with one of: a peer-to-peer transfer between the source device and the target device, a transfer between the source device and the machine, and a transfer from the source device to the target device through the machine.

8. The computer program product as described in claim 1 wherein the computer program instruction further include program code to provide a confirmation dialog prior to attempting to complete the copy or move operation.

9. The computer program product as described in claim 1 wherein the machine is one of: a smart phone, and a tablet device.

10. The computer program product as described in claim 9 wherein the data indicating the copy or move action is received upon completion of a gesture-based interaction with the display.

\* \* \* \* \*